United States Patent Office 2,726,273
Patented Dec. 6, 1955

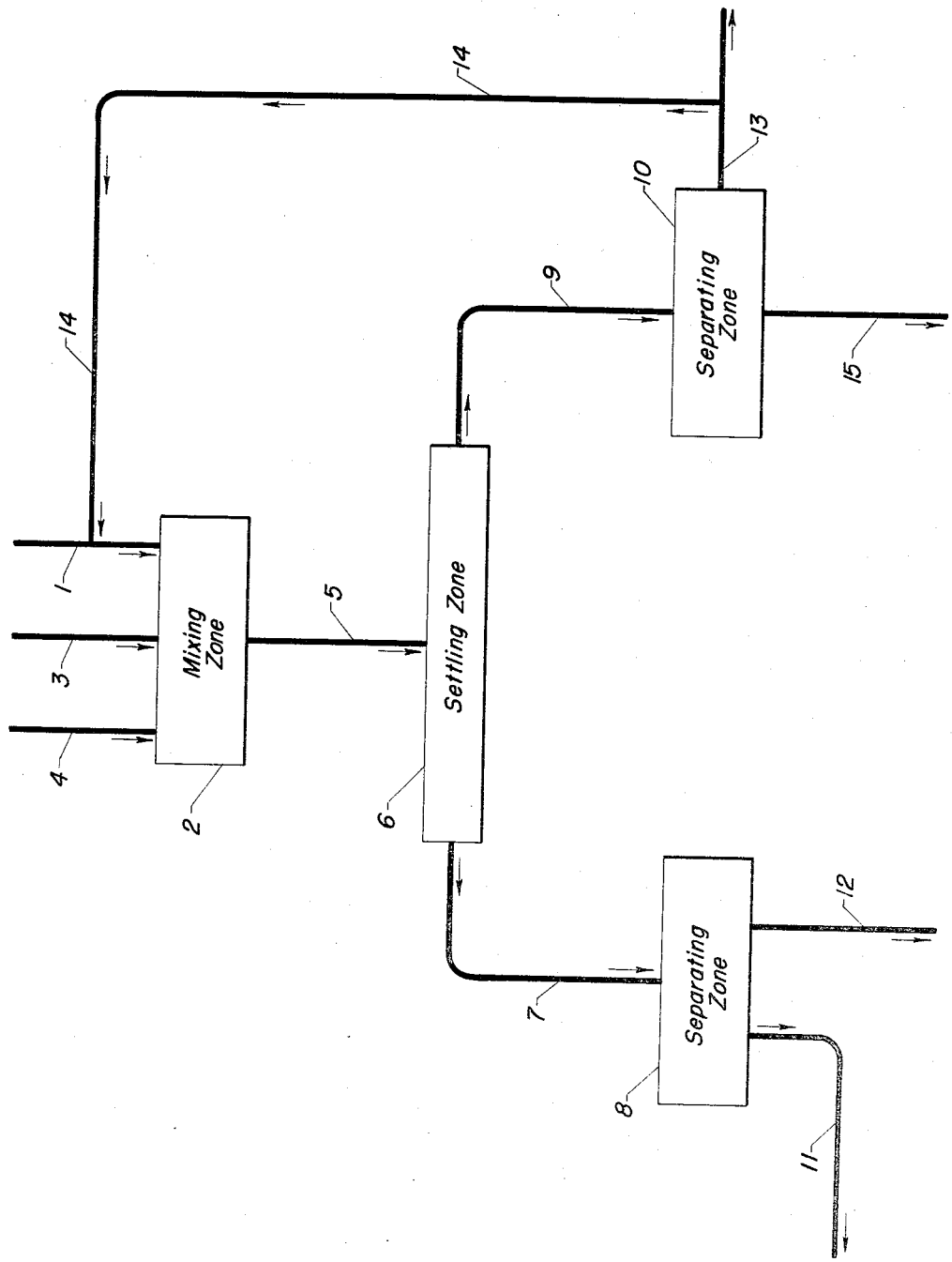

2,726,273
PRODUCTION OF DRYING OILS

Herman S. Bloch, Chicago, and Richard C. Wackher, La Grange, Ill., assignors to Universal Oil Products Company, Des Plaines, Ill., a corporation of Delaware Application November 17, 1952, Serial No. 320,961

20 Claims. (Cl. 260—666)

This application is a continuation-in-part of our copending application, Serial No. 30,157, filed May 29, 1948, now Patent No. 2,622,108, December 16, 1952.

This invention relates to a process for producing drying oils by converting mixtures of carbonylic compounds and olefinic hydrocarbons having at least 3 carbon atoms per molecule. More particularly, the invention is concerned with the production of a substantially saturated liquid hydrocarbon product and a higher boiling unsaturated liquid product by polymerization and hydrogen transfer reactions of a carbonylic compound and an olefinic hydrocarbon having at least 3 carbon atoms per molecule.

One of the objects of this invention is the manufacture of an unsaturated liquid product having more than one double bond per molecule.

A further object of this invention is the production of a substantially paraffinic hydrocarbon product and of a higher boiling unsaturated liquid organic material useful as a drying oil.

One specific embodiment of this invention relates to a process for producing a drying oil which comprises reacting a carbonylic compound and an olefinic hydrocarbon having at least 3 carbon atoms per molecule in the presence of an acid-acting metal halide catalyst until a reaction mixture comprising substantially saturated hydrocarbons and polyunsaturated organic compounds is formed, separating the reaction mixture into a hydrocarbon layer and a catalyst layer, separating substantially saturated hydrocarbons from the hydrocarbon layer, and recovering from the catalyst layer a drying oil having an average molecular weight greater than that of the olefinic charge stock.

Another specific embodiment of this invention relates to a process for producing a drying oil which comprises reacting a carbonylic compound and an olefinic hydrocarbon having at least 3 carbon atoms per molecule in the presence of aluminum chloride until a reaction mixture comprising substantially saturated hydrocarbons and polyunsaturated organic compounds is formed, separating the reaction mixture into a hydrocarbon layer and a catalyst layer, separating substantially saturated hydrocarbons from the hydrocarbon layer, and recovering from the catalyst layer a drying oil having an average molecular weight greater than that of the olefinic charge stock.

Another specific embodiment of this invention relates to a process for producing a drying oil which comprises reacting a carbonylic compound and an olefinic hydrocarbon having at least 3 carbon atoms per molecule in the presence of aluminum bromide until a reaction mixture comprising substantially saturated hydrocarbons and polyunsaturated organic compounds is formed, separating the reaction mixture into a hydrocarbon layer and a catalyst layer, separating substantially saturated hydrocarbons from the hydrocarbon layer, and recovering from the catalyst layer a drying oil having an average molecular weight greater than that of the olefinic charge stock.

Another specific embodiment of this invention relates to a process for producing a drying oil which comprises reacting a carbonylic compound and an olefinic hydrocarbon having at least 3 carbon atoms per molecule in the presence of boron trifluoride until a reaction mixture comprising substantially saturated hydrocarbons and polyunsaturated organic compounds is formed, separating the reaction mixture into a hydrocarbon layer and a catalyst layer, separating substantially saturated hydrocarbons from the hydrocarbon layer, and recovering from the catalyst layer a drying oil having an average molecular weight greater than that of the olefinic charge stock.

And in still another embodiment of this invention, a carbonylic compound and a normally liquid monoolefin hydrocarbon are subjected to polymerization and hydrogen transfer reactions in the presence of a catalyst comprising aluminum chloride at a reaction temperature and for a time sufficient to effect formation of a saturated hydrocarbon layer and a heavier lower layer comprising aluminum chloride and a highly unsaturated organic material, the reaction mixture is separated into an aluminum chloride catalyst layer and a hydrocarbon layer, substantially saturated hydrocarbon products having more carbon atoms per molecule than the charged liquid monoolefin are separated from the hydrocarbon layer, and an unsaturated drying oil is recovered from the aluminum chloride layer.

And in still another embodiment of this invention, a carbonylic compound and a normally liquid monoolefin hydrocarbon are subjected to polymerization and hydrogen transfer reactions in the presence of a catalyst comprising aluminum bromide at a reaction temperature and for a time sufficient to effect formation of a saturated hydrocarbon layer and a heavier lower layer comprising aluminum bromide and a highly unsaturated organic material, the reaction mixture is separated into an aluminum bromide catalyst layer and a hydrocarbon layer, substantially saturated hydrocarbon products having more carbon atoms per molecule than the charged liquid monoolefin are separated from the hydrocarbon layer, and an unsaturated drying oil is recovered from the aluminum bromide layer.

And in still another embodiment of this invention, a carbonylic compound and a normally liquid monoolefin hydrocarbon are subjected to polymerization and hydrogen transfer reactions in the presence of a catalyst comprising boron trifluoride at a reaction temperature and for a time sufficient to effect formation of a saturated hydrocarbon layer and a heavier lower layer comprising boron trifluoride and a highly unsaturated organic material, the reaction mixture is separated into a boron trifluoride catalyst layer and a hydrocarbon layer, substantially saturated hydrocarbon products having more carbon atoms per molecule than the charged liquid monoolefin are separated from the hydrocarbon layer, and an unsaturated drying oil is recovered from the boron trifluoride layer.

Monoolefinic hydrocarbons utilizable in the process have at least 3 carbon atoms per molecule and comprise propylene, the butylenes, pentenes, hexenes, heptenes, octenes, and higher boiling monoolefinic hydrocarbons. A perferred source of such monoolefinic hydrocarbons is polymer gasoline which is formed, for example, by polymerizing propylene and butylenes or mixtures thereof in the presence of solid phosphoric acid catalyst which is a calcined composite of a phosphoric acid and a siliceous carrier such as diatomaceous earth, also called kieselguhr. Fractions of cracked gasoline containing substantial amounts of olefins and relatively small proportions of aromatic hydrocarbons are also suitable charging stocks. These gasoline charging stocks may also contain certain amounts of paraffinic and naphthenic hydrocarbons some of which may be alkylated during the polymerization treatment. C₃ and C₄ fractions recovered from the products of cracking and a C₄ fraction recovered from butane dehydrogenation and containing mainly butylenes and normal butane with relatively little isobutane are also good charging stocks for this process.

This invention relates to the conjunct copolymerization of aliphatic olefinic hydrocarbons with certain polar compounds characterized by possession of one or more groups of the type

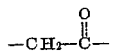

and otherwise lacking in unsaturation. Such compounds are capable of enolization, and although it is doubtful whether they actually enolize under the conditions of conjunct polymerization, they appear to undergo conjunct copolymerization with the hydrocarbon olefins to form a polyenic product containing oxygen. Examples of such materials containing carbonyl groups are diacetone alcohol, triacetin, ethyl laurate, polyvinylacetate, the ethylene glycol ester of adipic acid, the polyamide of hexamethylene diamine and adipic acid, acetophenone, cyclopentanone, acetoacetic ester, diethylmalonate, phenylacetic acid, heptaldehyde, butyric acid amide, and the like; or, in general, saturated compounds containing aldehyde, ketone, carboxylic acid, ester, or amide groups. The carbonylic compounds used in this process may also contain carboxylic acid groups such as are present in pyruvic acid ($CH_3COCOOH$), in levulinic acid

and in other polyfunctional compounds.

Polymerization catalysts utilizable in the production of drying oils from a sludge containing the same include acid-acting metal halides such as aluminum bromide and aluminum chloride and for the purpose of this specification, boron trifluoride is considered an acid-acting metal halide catalyst. While these catalysts are generally used by themselves, it is within the scope of this invention to use acid-acting gases as promoters for these catalysts, when necessary. These acid-acting gases include hydrogen fluoride and hydrogen chloride, and in some instances hydrogen bromide in the vapor state may be utilized. These catalysts form conjunct polymerization products which are structurally and physically similar to the conjunct polymers formed when hydrogen fluoride is utilized, as described in our copending application, Serial No. 30,157, filed May 29, 1948, now Patent No. 2,622,108. These catalysts differ chiefly from hydrogen fluoride in the manner of recovering the conjunct polymers from sludges containing said catalysts.

The operating temperature employed in this process has a profound influence upon the nature of the reaction occurring when a carbonylic compound and an olefinic hydrocarbon are contacted with an acid-acting metal halide catalyst for example, with aluminum chloride. Part of this effect of temperature may be due to the behavior of the olefins themselves in the presence of an acid-acting metal halide catalyst. The monoolefins having at least 3 carbon atoms per molecule undergo extensive polymerization and condensation with carbonylic compounds, particularly aldehydes and ketones, in the presence of an acid-acting metal halide catalyst at temperatures of from about 10° to about 125° C. Also the condensation and polymerization of these olefins and carbonylic compounds involves more than the simple combination of olefinic molecules to form dimers, trimers, tetramers, and higher polymers.

It has been observed and these observations have been made the basis of the present process that when a mixture of olefinic hydrocarbons and carbonyl compounds is subjected to conjunct copolymerization in the presence of a conjunct polymerization catalyst heretofore specified, a conjunct polymer product is formed in significantly greater yield than in the case of the conjunct polymerization of the monoolefin only. The modified chemical structure of the product (by virtue of the presence of oxygen compounds) markedly affects the drying properties of the material, the modified polymer forming an air-dried film of excellent adherence which dries completely to a non-tacky, non-brittle film possessing the desired properties of such films for drying oil purposes. Further, the presence of carbonyl compounds such as diacetone alcohol in the charging stock tends to increase the yield of conjunct polymers obtained from a given weight of charge and conjunct polymerization catalyst. The latter effect is believed to be due to the increased number of hydrogen acceptors per unit weight of reactants charged to the process.

The complex series of reactions herein referred to in the aggregate as a "conjunct polymerization reaction" comprises an initial polymerization and condensation reaction between the olefinic and carbonylic components of the charging stock and as the reaction progresses further, cyclization and isomerization of the polymers and condensation products occur, accompanied by a hydrogen transfer reaction between the organic compounds or "conjunct polymers" present in the reaction mixture whereby a portion of the conjunct polymers are converted into saturated hydrocarbons by virtue of the hydrogen transfer at the expense of other comopnents which are converted into highly unsaturated organic compounds containing on an average of from about 2.5 to about 4 double bonds per molecule of which from about 40 to about 70% are conjugated. The resulting unsaturated conjunct polymers comprising a series of high molecular weight polyolefinic cyclic compounds become attached by weak chemical bonds to the catalyst to form a sludge-like complex addition in which the chlorine (in the case of an aluminum chloride catalyst) is not, however, organically bound, since it can be substantially all removed by treatment of the complex with water or cold aqueous alkali. The saturated hydrocarbon conjunct polymers form an insoluble phase which upon settling of the reaction mixture separates as a distinct upper layer hereinabove referred to. Since the formation of the unsaturated conjunct polymer is dependent upon the presence of hydrogen acceptors in the reaction mixture, it also follows that the proportion of hydrogen acceptors to hydrogen donors influences the total unsaturation of the polyolefinic conjunct polymers formed, as well as their yield from given weights of hydrocarbons and carbonyl compounds charged. The knowledge of the relationship between unsaturation of the hydrocarbon charging stock and the unsaturation of the ultimate hydrocarbon drying oil product is embodied in the utilization of an admixture of carbonyl compounds and monoolefins as charging stock in the present process to obtain conjunct copolymerization therebetween and to form a greater yield of conjunct polymers having somewhat different chemical structure than a product similarly prepared by conjunct polymerization of a monoolefin hydrocarbon only. The oxygen-modified structures of the conjunct polymers obtained in accordance with the process herein provided are believed to be the basic factors involved in the formation of the more adherent, more elastic, and tougher film, on oxidation of the drying oil when exposed to atmospheric oxygen.

Study of the ultraviolet and infrared absorption spectra and other properties of drying oil fractions formed from polymer gasoline and boiling from about 150° to about 200° C., shows that many of these drying oil hydrocarbons contain a pair of conjugated double bonds with one of these double bonds in a ring of 5 carbon atoms and the other double bond in an alkenyl side chain. Thus a cyclopentene ring may be combined with a methylene group or a vinyl group. However, some of the drying oil hydrocarbons may also contain a cyclopentadiene ring. The drying oil hydrocarbons which contain a cyclopentenyl ring also contain more than two substituent groups but each of these groups is highly substituted. The higher boiling fractions of this drying oil boiling up to about 450° C. contain polycyclic hydrocarbons which are generally bicyclic. In both the monocyclic and polycyclic hydrocarbons the five-carbon atom ring portions of the molecules are combined with at least two alkyl groups or two unsaturated aliphatic groups. The data obtained on these fractions indicate that one of the double bonds comprised by the conjugated diene systems of the drying oil is within a five-carbon atom ring and the other double bond is in most cases in an alkenyl or alkapolyenyl substituent. Alkapolyenyl groups that may be present are highly branched and contain isolated unsaturation as well as conjugated unsaturation. Some of the typical hydrocarbons contained in the drying oil mixtures so produced from polymer gasoline are represented structurally by the following formula:

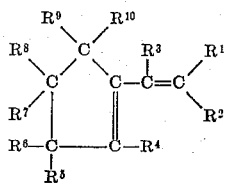

wherein the radicals $R^1$ to $R^{10}$ are selected from the group consisting of hydrogen and alkyl, alkenyl and alkapolyenyl hydrocarbon radicals, at least two of the substituents $R^4$ to $R^{10}$ are hydrocarbon radicals, and not more than two of the groups $R^1$ to $R^4$ represent hydrogen.

Other constituents of the drying oil formed from polymer gasoline are believed to have structures that may be represented by the formula:

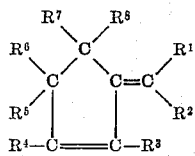

wherein $R^1$ to $R^8$ represent members of the group consisting of hydrogen and alkyl, alkenyl, and alkapolyenyl hydrocarbon radicals, at least two of the substituents $R^3$ to $R^8$ are hydrocarbon radicals, and not more than two of the substituents $R^1$ to $R^4$ are hydrogen.

The drying oils of the present process contain organic compounds having some of the aforementioned five-carbon atom ring structures condensed with a carbonylic compound.

The condensation products which are formed from the olefinic hydrocarbons and carbonyl compounds are of higher molecular weight than the olefinic hydrocarbon charging stock and have good drying oil properties. Such drying oils which may be regarded as mixtures of condensation products and high boiling conjunct polymers have a high degree of conjugated and nonconjugated unsaturation. These drying oils have the advantage that they form protective films that are less brittle, more adherent, and more durable than those formed from high boiling unsaturated oils produced similarly from mono-olefin hydrocarbons without the addition of carbonylic compounds.

This condensation or copolymerization process for producing drying oils may be modified further by incorporating in the reaction mixture a certain amount of a more unsaturated olefinic hydrocarbon, namely, a dienic hydrocarbon such as, for example, butadiene-1,3, isoprene, cyclopentadiene, and the like; or an acetylenic hydrocarbon.

The process consists essentially of contacting a mixture of an olefinic hydrocarbon and a carbonylic compound with an acid-acting metal halide catalyst at conjunct polymerization conditions, separating the upper saturated hydrocarbon layer from the lower catalyst sludge layer, and then decomposing the sludge by water hydrolysis, neutralization with caustic, or by other suitable means to recover the drying oil therefrom. Improvement in adherent properties of the drying oil product is observed when about 2 mol per cent of the carbonyl compound is present. When more than about an equal molecular proportion of carbonyl compound is present, the amount of condensation and speed of the condensation process are retarded. Accordingly, the molar ratio of olefin to carbonylic compound will depend upon the properties desired in the product but may vary from about 1 to about 50. The weight ratio of acid-acting metal halide catalyst to organic charging stock, i. e., the combined mixture of carbonylic compounds and organic hydrocarbon may vary from about 0.1 to about 10, although the catalyst requirements vary with the amount of carbonyl compound used in the reactant mixture and in general a molar excess of catalyst over carbonyl compound is required. When the acid-acting metal halide catalyst to organic compound weight ratio is less than about 0.1, it is necessary to recycle excessive amounts of organic compounds in order to obtain good conversion while increases in this ratio above about 10 effect very little further increase in yield of the desired reaction products but such increased ratio of acid-acting metal halide catalyst to organic reactants does decrease the capacity of the reactor and other treating equipment.

The present process is carried out at a temperature of from about 0° to about 175° C. and at a pressure sufficient to maintain the reactants and catalysts in substantially liquid phase. The operating pressure is generally about 1 to about 100 atmospheres. At these reaction conditions, a vigorously agitated mixture of aluminum chloride, carbonylic compound and olefinic hydrocarbon containing at least 3 carbon atoms per molecule yields a high proportion of catalyst layer containing polyunsaturated organic compounds during a time of from about 1 to about 30 minutes, but the reaction may be continued for a longer time to obtain a better yield of the polyunsaturated organic compounds and a more highly saturated hydrocarbon mixture which is separated as an upper layer from the aluminum chloride layer.

Olefinic hydrocarbons having more than 3 carbon atoms per molecule are more desirable as charging stocks than propylene because of the increased yields of both saturated and unsaturated liquid products and improved properties of the products obtained from these preferred charging stocks. About the same quantity and quality of drying oil are obtained when charging any of the olefins having from 4 to about 12 carbon atoms per molecule. The different monolefins having at least 4 carbon atoms per molecule appear to be mutually interconvertible by polymerization and depolymerization reactions at the conditions specified for this purpose.

It is of particular interest to note that in this type of copolymerization, in which hydrogen transfer occurs, the product recovered from the sludge or catalyst layer has a higher molecular weight than the charge stock, and is generally more unsaturated than the charge stock.

It should be noted further that the introduction of polar groups into the polyenic conjunct polymer permits further modification of this product. For example, if an alcohol group is introduced into the molecule by conjunct polymerization, the product may be esterified subsequently with either monobasic or polybasic acids (which may, in turn, be saturated or unsaturated) to make a large variety of esters and polyesters having a wide range of properties, or if acidic groups are introduced into the molecule by conjunct polymerization, the product may be esterified subsequently with either monohydric or polyhydric alcohols, or be reacted with amines, of either saturated or unsaturated type, to make a large variety of esters and amides having a wide range of properties.

In carrying out this process, a carbonylic compound, an olefinic hydrocarbon having at least 3 carbon atoms per molecule, and an acid-acting metal halide catalyst, such as aluminum chloride, are added to a reactor provided with adequate means for agitating the reactor contents and for controlling the temperature therein. Since the polymerization and copolymerization reactions of this process are exothermic, it is generally necessary to cool the reactor in order to maintain a chosen reaction temperature. The carbonylic compound, olefin hydrocarbon, and acid-acting metal halide catalyst, such as aluminum chloride, are generally mixed at such rates that substantially complete conversion of all the organic compounds charged is effected. After the desired quantity of organic material, comprising essentially olefinic hydrocarbons and carbonylic compounds, has been added to the acid-acting metal halide catalyst, such as aluminum chloride, or after the acid-acting metal halide catalyst has been added to the organic materials, the agitation or stirring of the reaction mixture is generally continued for a time sufficient to ensure substantially complete conversion of the reactants into saturated hydrocarbons and also highly unsaturated organic liquids having drying oil properties and associated with the catalyst. The agitation or mixing is then stopped and the reaction mixture is permitted to stand whereby it forms two layers: an upper substantially saturated hydrocarbon layer and a lower acid-acting metal halide catalyst layer. The substantially saturated hydrocarbon layer is separated from the lower acid-acting metal halide catalyst layer containing the highly unsaturated organic material with drying oil properties.

As the saturated hydrocarbons of the upper layer boil over about the same range of temperature as do the unsaturated drying oil constituents recoverable from the acid-acting metal halide catalyst lower layer and as small amounts of the saturated hydrocarbons are entrained or mixed with the acid-acting metal halide catalyst lower layer, it is advisable to extract the acid-acting metal halide catalyst lower layer with a low boiling saturated hydrocarbon, preferably a paraffin having from 3 to about 8 carbon atoms per molecule, before hydrolyzing or otherwise decomposing the acid-acting metal halide catalyst lower layer to recover the unsaturated drying oil therefrom. From the lower layer, the acid-acting metal halide catalyst and drying oil fractions are then separated by suitable means, for example, the lower layer may be added to water or ice whereby the acid-acting metal halide catalyst reacts with the water to form an aqueous solution or suspension from which the drying oil separates as an upper layer. In some instances, it may be desirable to use a caustic solution for decomposition of the drying oil and acid-acting metal halide catalyst complex. Also when the acid-acting metal halide catalyst is boron trifluoride, the lower layer may be subjected to flash distillation to vaporize the boron trifluoride from the higher boiling highly unsaturated drying oil. When the lower layer is separated by distillation methods, the recovered boron trifluoride is suitable for recycling to the process to effect reaction of additional quantities of the charged monoolefinic hydrocarbon and carbonylic compound.

The passage of inert gas, such as nitrogen, hydrogen, methane, ethane, carbon dioxide, and the like, through the distillation system in which the boron trifluoride is being separated, assists in the recovery of the highly unsaturated drying oil.

One method of carrying out the process of this invention is illustrated diagrammatically by the figure which is a flow diagram indicating the various steps of the process. According to the method illustrated, an olefin-containing feed stock, such as a butane-butylene or pentane-pentene mixture, is directed through line 1 to mixing zone 2 to which a carbonylic compound such as diacetone alcohol is directed through line 3 and anhydrous aluminum chloride is introduced through line 4. Mixing zone 2 comprises a coil, an agitated reaction zone, or other mixing equipment, preferably provided with suitable temperature control means, such as, for example, a cooling or heating jacket or a cooling or heating coil in order to maintain the reaction mixture at a chosen temperature within the limits of from about 0° to about 175° C. The reaction mixture present in mixing zone 2 may also contain a low boiling saturated hydrocarbon which is separated from the final reaction products and recycled through line 14 to line 1 hereinafter described. The olefin-containing feed stocks, carbonylic compound and aluminum chloride are contacted in mixing zone 2 for a time sufficient to convert substantially all the olefin monomer and carbonylic compound into polymers and condensation product, and also to effect hydrogen transfer reactions between the various polymers and condensation products so as to produce a substantially saturated hydrocarbon product and a highly unsaturated product, the latter being associated with the aluminum chloride catalyst.

From mixing zone 2, the resultant mixture is directed through line 5 to settling zone 6 wherein the mixture or emulsion of organic compounds and aluminum chloride is permitted to stand and to separate into an upper hydrocarbon layer and a lower aluminum chloride catalyst layer. From settling zone 6, the aluminum chloride catalyst layer is withdrawn through line 7 to catalyst layer separating zone 8 while the substantially saturated hydrocarbon material which separates as an upper layer in zone 6 is directed therefrom through line 9 to hydrocarbon layer separating zone 10.

The aluminum chloride catalyst layer in separating zone 8 is decomposed, as hereinbefore set forth with water or caustic, to separate therefrom a highly unsaturated organic material, comprising drying oil materials. The decomposed aluminum chloride so separated in zone 8 is directed therefrom through line 11 to disposal or recovery of desired aluminum salts or oxides. The highly unsaturated liquid drying oil material is discharged from separating zone 8 through line 12 to storage or to further purification or fractionation not illustrated in the figure.

The hydrocarbon layer so separated from used aluminum chloride catalyst in settling zone 6 is subjected to suitable fractionation in hydrocarbon separating zone 10. Fractional distillation of the hydrocarbonaceous material present in zone 10 separates therefrom as an overhead fraction, substantially saturated lower boiling hydrocarbons introduced into the process in the olefin-containing charge stock. Thus when charging a butane-butylene fraction, the hydrocarbon stream being directed from separating zone 10 through line 13 is mainly n-butane while this stream is mainly n-pentane when a pentane-pentene mixture is charged to mixing zone 2. If desired, a portion of the low boiling saturated hydrocarbon fraction which is discharged through line 13 may be directed therefrom through recycle line 14 to line 1 already mentioned through which the olefin-containing feed stock is directed to the process. After the removal of the low boiling saturated hydrocarbons in hydrocarbon separating zone 10, a substantially saturated hydrocarbon product formed by the condensation, polymerization, and hydrogen transfer reactions is directed from zone 10 through line 15 to further purification where any residual amounts of aluminum chloride catalyst may be washed therefrom, and then to storage or to use not illustrated in the diagrammatic drawing.

When the olefinic charge stock does not contain a substantial proportion of saturated hydrocarbons having from 3 to about 8 carbon atoms per molecule, it is advisable to extract the aluminum chloride catalyst layer with such a solvent before separating the drying oil from the aluminum chloride layer in separating zone 8.

The following examples are given to illustrate the process of this invention although the data introduced should not be misconstrued to limit unduly the broad scope of the invention.

EXAMPLE I

Polymer gasoline and diacetone alcohol are treated with aluminum chloride to produce a drying oil. The polymer gasoline, which boiled between 28° and 225° C. had a specific gravity, $d_4^{20}$, of 0.712, a Reid vapor pressure of 12.7 pounds per square inch, a bromine number of 132, a molecular weight of 105 and a sulfur content of 0.04% by weight. In carrying out this process, 420 grams of polymer gasoline and 26 grams of diacetone alcohol are charged to a turbomixer autoclave of 1,000 ml. capacity, the free space is flushed with nitrogen and then 117 grams of anhydrous aluminum chloride is slowly added to the mixture of polymer and diacetone alcohol. The resultant reaction mixture is stirred for four hours at a temperature of about 90° C. The resultant reaction mixture is then permitted to stand in a settler at room temperature, and separates into about 312 grams of an upper layer and about 250 grams of a lower aluminum chloride layer. The lower aluminum chloride layer is hydrolyzed with water, and then washed with water. The organic liquid which is obtained from the hydrolysis weighs about 130 grams.

In this treatment of a mixture of polymer gasoline and diacetone alcohol with anhydrous aluminum chloride, a typical conjunct polymerization occurs in which a relatively saturated hydrocarbon layer and a lower aluminum chloride layer containing highly unsaturated compounds is obtained. Carbon and hydrogen analysis of the organic liquid obtained by hydrolyzing the aluminum chloride layer shows the presence of about 1.8 per cent oxygen which represents about 33 per cent of the oxygen charged in the diacetone alcohol. The 33 per cent represents only a minimum value of the percentage of the charged diacetone alcohol appearing in the lower layer product, since some of the oxygen might be lost in dehydration reactions. The larger yield of unsaturated product, namely about 130 grams, over a normal yield of 58 grams of drying oil product obtained from polymer gasoline alone shows that more than 33 per cent of the diacetone alcohol appeared to undergo conversion.

Drying tests on the resultant drying oils which can be recovered from the aluminum chloride layer and which have a molecular weight of about 340, show that it dries hard in 2-4 days either in the presence or absence of driers such as naphthenates of cobalt, manganese, and lead. The dried film of the drying oil has a maximum Sward hardness of about 16.

Other properties of the upper layer and lower layer hydrocarbons obtained by this reaction of polymer gasoline with diacetone alcohol in the presence of anhydrous aluminum chloride are given in the following table:

Table 1.—*Properties of reaction products from diacetone alcohol and polymer gasoline*

Upper layer:
  Bromine number _____ 31
  $d_4^{20}$ _____ 0.8095
Lower layer product:
  Bromine number _____ 152
  Maleic Anhydride value _____ 52
  Mol. wt _____ 340
  $d_4^{20}$ _____ 0.869
  Color (Gardner) _____ 12
  $n_D^{20}$ _____ 1.4882
  Spec. disp _____ 136
  Carbon, percent _____ 86.2
  Hydrogen, percent _____ 12.0

DRYING TEST

| | with drier | without drier |
|---|---|---|
| Dry (dust free), days | <1 | 3 |
| Max. Sward hardness | 16 | 16 |
| Dried hard, days | 2 | 4 |

DISTILLATIONS

Upper layer (ml.):
  I. B. P., ° C _____ 107
  10% over _____ 143
  30 _____ 212
  50 _____ 280
  70 _____ 332
  90 _____ 354
  E. P _____ 367
Lower layer:
  I. B. P., ° C _____ 140
  10% over _____ 180
  30 _____ 285
  50 _____ 335
  70 _____ >375

EXAMPLE II

Following the procedure used in Example I, 2610 grams of the mentioned polymer gasoline, 436 grams of triacetin, $CH_3COOCH_2CH(OCOCH_3)CH_2OCOCH_3$, and 587 grams of anhydrous aluminum chloride, and 158 grams of hydrogen chloride are stirred for 8 hours at a temperature of about 60° C. The resultant liquid reaction mixture is then separated into about 1940 grams of upper layer (including dissolved hydrogen chloride) and about 1810 grams of lower layer.

Conjunct polymerization occurs in this run as is evidenced by the fact that the upper layer consists substantially of saturated hydrocarbons. The upper layer and pentane extract of the lower layer after washing with water and drying weighs about 1928 grams. The lower layer after hydrolysis and water wash of the organic material yields about 1090 grams of organic liquid. The carbon and hydrogen analysis of the lower layer shows the presence of about 4.4 per cent oxygen thus evidencing copolymerization or condensation of the polymer gasoline and triacetin. About half of the drying oil material (lower layer product) boils higher than 325° C. Drying tests on the entire lower layer product in the presence of driers show that this material dries in 6 days to a non-brittle film with a Sward hardness of about 15.

Further properties of the upper layer hydrocarbons and lower layer drying oil are given in Table 2.

Table 2.—*Properties of reaction products from triacetin and polymer gasoline*

Upper layer:
  Bromine number _____ 37
  $d_4^{20}$ _____ 0.8143
Lower layer product:
  Bromine number _____ 146
  Maleic anhydride value _____ 47
  Mol. wt _____ 294
  $d_4^{20}$ _____ 0.852
  Color (Gardner) _____ 10
  Carbon, per cent _____ 83.5
  Hydrogen, per cent _____ 12.1
Drying test (with drier):
  Dust free in, days _____ 4
  Dried hard in, days _____ 6
  Sward hardness _____ 16

DISTILLATIONS

Upper layer (ml.):
  I. B. P., ° C _____ 77
  10% over _____ 129
  30 _____ 201
  50 _____ 277
  70 _____ 329
  90 _____ 354
  E. P _____ 370
Lower layer:
  I. B. P., ° C _____ 146
  10% over _____ 184
  30 _____ 287
  50 _____ 325
  70 _____ >375

We claim as our invention:

1. A process for producing a drying oil which comprises mixing from about 0.1 to about 10 parts by weight of an acid-acting metal halide catalyst and 1 part by weight of a mixture of 1 molar proportion of a carbonylic compound and 1–50 molar proportions of a monoolefinic hydrocarbon having at least 3 carbon atoms per molecule at a temperature of from about 0° to about 175° C., said carbonylic compound being a saturated compound containing a radical of the class consisting of aldehyde, ketone, carboxylic acid, ester and amide groups, agitating the reaction mixture for a time sufficient to form polymerization and condensation products and to effect hydrogen exchange to form a polyunsaturated drying oil and a saturated hydrocarbon material, separating the reaction mixture into a hydrocarbon layer and an acid-acting metal halide catalyst layer, recovering a drying oil from the acid-acting metal halide catalyst layer and recovering a saturated hydrocarbon product from the hydrocarbon layer.

2. A process for producing a drying oil which comprises mixing from about 0.1 to about 10 parts by weight of an acid-acting metal halide catalyst and 1 part by weight of a mixture of 1 molar proportion of a carbonylic compound and 1–50 molar proportions of a propylene at a temperature of from about 0° to about 175° C. said carbonylic compound being a saturated compound containing a radical of the class consisting of aldehyde, ketone, carboxylic acid, ester and amide groups, agitating the reaction mixture for a time sufficient to form polymerization and condensation products and to effect hydrogen exchange to form a polyunsaturated drying oil and a saturated hydrocarbon material, separating the reaction mixture into a hydrocarbon layer and an acid-acting metal halide catalyst layer, recovering a drying oil from the acid-acting metal halide catalyst layer and recovering a saturated hydrocarbon product from the hydrocarbon layer.

3. A process for producing a drying oil which comprises mixing from about 0.1 to about 10 parts by weight of an acid-acting metal halide catalyst and 1 part by weight of a mixture of 1 molar proportion of a carbonylic compound and 1–50 molar proportions of a butylene at a temperature of from about 0° to about 175° C., said carbonylic compound being a saturated compound containing a radical of the class consisting of aldehyde, ketone, carboxylic acid, ester and amide groups, agitating the reaction mixture for a time sufficient to form polymerization and condensation products and to effect hydrogen exchange to form a polyunsaturated drying oil and a saturated hydrocarbon material, separating the reaction mixture into a hydrocarbon layer and an acid-acting metal halide catalyst layer, recovering a drying oil from the acid-acting metal halide catalyst layer and recovering a saturated hydrocarbon product from the hydrocarbon layer.

4. A process for producing a drying oil which comprises mixing from about 0.1 to about 10 parts by weight of an acid-acting metal halide catalyst and 1 part by weight of a mixture of 1 molar proportion of a carbonylic compound and 1–50 molar proportions of a normally liquid monoolefin having at least 3 carbon atoms per molecule at a temperature of from about 0° to about 175° C., said carbonylic compound being a saturated compound containing a radical of the class consisting of aldehyde, ketone, carboxylic acid, ester and amide groups, agitating the reaction mixture for a time sufficient to form polymerization and condensation products and to effect hydrogen exchange to form a polyunsaturated drying oil and a saturated hydrocarbon material, separating the reaction mixture into a hydrocarbon layer and an acid-acting metal halide catalyst layer, recovering a drying oil from the acid-acting metal halide catalyst layer and recovering a saturated hydrocarbon product from the hydrocarbon layer.

5. A process for producing a drying oil which comprises mixing from about 0.1 to about 10 parts by weight of an acid-acting metal halide catalyst and 1 part by weight of a mixture of 1 molar proportion of a carbonylic compound and 1–50 molar proportions of a polymer gasoline at a temperature of from about 0° to about 175° C., said carbonylic compound being a saturated compound containing a radical of the class consisting of aldehyde, ketone, carboxylic acid, ester and amide groups, agitating the reaction mixture for a time sufficient to form polymerization and condensation products and to effect hydrogen exchange to form a polyunsaturated drying oil and a saturated hydrocarbon material, separating the reaction mixture into a hydrocarbon layer and an acid-acting metal halide catalyst layer, recovering a drying oil from the acid-acting metal halide catalyst layer, and recovering a saturated hydrocarbon product from the hydrocarbon layer.

6. A process for producing a drying oil which comprises mixing from about 0.1 to about 10 parts by weight of aluminum chloride and 1 part by weight of a mixture of 1 molar proportion of a carbonylic compound and 1–50 molar proportions of a monoolefinic hydrocarbon having at least 3 carbon atoms per molecule at a temperature of from about 0° to about 175° C. said carbonylic compounds being a saturated compound containing a radical of the class consisting of aldehyde, ketone, carboxylic acid, ester and amide groups, agitating the reaction mixture for a time sufficient to form polymerization and condensation products and to effect hydrogen exchange to form a polyunsaturated drying oil and a saturated hydrocarbon material, separating the reaction mixture into a hydrocarbon layer and aluminum chloride layer, recovering a drying oil from the aluminum chloride layer and recovering a saturated hydrocarbon product from the hydrocarbon layer.

7. A process for producing a drying oil which comprises mixing from about 0.1 to about 10 parts by weight of aluminum chloride and 1 part by weight of a mixture of 1 molar proportion of a carbonylic compound and 1–50 molar proportions of a propylene at a temperature of from about 0° to about 175° C., said carbonylic compound being a saturated compound containing a radical of the class consisting of aldehyde, ketone, carboxylic acid, ester and amide groups, agitating the reaction mixture for a time sufficient to form polymerization and condensation products and to effect hydrogen exchange to form a polyunsaturated drying oil and a saturated hydrocarbon material, separating the reaction mixture into a hydrocarbon layer and aluminum chloride layer, recovering a drying oil from the aluminum chloride layer and recovering a saturated hydrocarbon product from the hydrocarbon layer.

8. A process for producing a drying oil which comprises mixing from about 0.1 to about 10 parts by weight of aluminum chloride and 1 part by weight of a mixture of 1 molar proportion of a carbonylic compound and 1–50 molar proportions of a butylene at a temperature of from about 0° to about 175° C., said carbonylic compound being a saturated compound containing a radical of the class consisting of aldehyde, ketone, carboxylic acid, ester and amide groups, agitating the reaction mixture for a time sufficient to form polymerization and condensation products and to effect hydrogen exchange to form a polyunsaturated drying oil and a saturated hydrocarbon material, separating the reaction mixture into a hydrocarbon layer and an aluminum chloride layer, recovering a drying oil from the aluminum chloride layer and recovering a saturated hydrocarbon product from the hydrocarbon layer.

9. A process for producing a drying oil which comprises mixing from about 0.1 to about 10 parts by weight of aluminum chloride and 1 part by weight of a mixture of 1 molar proportion of a carbonylic compound and 1–50 molar proportions of a normally liquid monoolefin having at least 3 carbon atoms per molecule at a temperature of from about 0° to about 175° C., said carbonylic compound being a saturated compound containing a radical of the class consisting of aldehyde, ketone, carboxylic acid, ester and amide groups, agitating the reaction mixture for a time sufficient to form polymerization and condensation products and to effect hydrogen exchange to form a polyunsaturated drying oil and a saturated hydrocarbon material, separating the reaction mixture into a hydrocarbon layer and aluminum chloride layer, recovering a drying oil from the aluminum chloride layer and recovering a saturated hydrocarbon product from the hydrocarbon layer.

10. A process for producing a drying oil which comprises mixing from about 0.1 to about 10 parts by weight of aluminum chloride and 1 part by weight of a mixture of 1 molar proportion of a carbonylic compound and 1–50 molar proportions of a polymer gasoline having at least 3 carbon atoms per molecule at a temperature of from about 0° to about 175° C., said carbonylic compound being a saturated compound containing a radical of the class consisting of aldehyde, ketone, carboxylic acid, ester and amide groups, agitating the reaction mixture for a time sufficient to form polymerization and condensation products and to effect hydrogen exchange to form a polyunsaturated drying oil and a saturated hydrocarbon material, separating the reaction mixture into a hydrocarbon layer and aluminum chloride layer, recovering a drying oil from the aluminum chloride layer and recovering a saturated hydrocarbon product from the hydrocarbon layer.

11. A process for producing a drying oil which comprises mixing from about 0.1 to about 10 parts by weight of an aluminum bromide and 1 part by weight of a mixture of 1 molar proportion of a carbonylic compound and 1–50 molar proportions of a monoolefinic hydrocarbon having at least 3 carbon atoms per molecule at a temperature of from about 0° to about 175° C., said carbonylic compound being a saturated compound containing a radical of the class consisting of aldehyde, ketone, carboxylic acid, ester and amide groups, agitating the reaction mixture for a time sufficient to form polymerization and condensation products and to effect hydrogen exchange to form a polyunsaturated drying oil and a saturated hydrocarbon material, separating the reaction mixture into a hydrocarbon layer and an aluminum bromide layer, recovering a drying oil from the aluminum bromide layer and recovering a saturated hydrocarbon product from the hydrocarbon layer.

12. A process for producing a drying oil which comprises mixing from about 0.1 to about 10 parts by weight of an aluminum bromide and 1 part by weight of a mixture of 1 molar proportion of a carbonylic compound and 1–50 molar proportions of a propylene at a temperature of from about 0° to about 175° C., said carbonylic compound being a saturated compound containing a radical of the class consisting of aldehyde, ketone, carboxylic acid, ester and amide groups, agitating the reaction mixture for a time sufficient to form polymerization and condensation products and to effect hydrogen exchange to form a polyunsaturated drying oil and a saturated hydrocarbon material, separating the reaction mixture into a hydrocarbon layer and an aluminum bromide layer, recovering a drying oil from the aluminum bromide layer and recovering a saturated hydrocarbon product from the hydrocarbon layer.

13. A process for producing a drying oil which comprises mixing from about 0.1 to about 10 parts by weight of an aluminum bromide and 1 part by weight of a mixture of 1 molar proportion of a carbonylic compound and 1–50 molar proportions of a butylene at a temperature of from about 0° to about 175° C., said carbonylic compound being a saturated compound containing a radical of the class consisting of aldehyde, ketone, carboxylic acid, ester and amide groups, agitating the reaction mixture for a time sufficient to form polymerization and condensation products and to effect hydrogen exchange to form a polyunsaturated drying oil and a saturated hydrocarbon material, separating the reaction mixture into a hydrocarbon layer and an aluminum bromide layer, recovering a drying oil from the aluminum bromide layer and recovering a saturated hydrocarbon product from the hydrocarbon layer.

14. A process for producing a drying oil which comprises mixing from about 0.1 to about 10 parts by weight of an aluminum bromide and 1 part by weight of a mixture of 1 molar proportion of a carbonylic compound and 1–50 molar proportions of a normally liquid monoolefin having at least 3 carbon atoms per molecule at a temperature of from about 0° to about 175° C., said carbonylic compound being a saturated compound containing a radical of the class consisting of aldehyde, ketone, carboxylic acid, ester and amide groups, agitating the reaction mixture for a time sufficient to form polymerization and condensation products and to effect hydrogen exchange to form a polyunsaturated drying oil and a saturated hydrocarbon material, separating the reaction mixture into a hydrocarbon layer and an aluminum bromide layer, recovering a drying oil from the aluminum bromide layer and recovering a saturated hydrocarbon product from the hydrocarbon layer.

15. A process for producing a drying oil which comprises mixing from about 0.1 to about 10 parts by weight of aluminum bromide and 1 part by weight of a mixture of 1 molar proportion of a carbonylic compound and 1–50 molar proportions of a polymer gasoline having at least 3 carbon atoms per molecule at a temperature of from about 0° to about 175° C., said carbonylic compound being a saturated compound containing a radical of the class consisting of aldehyde, ketone, carboxylic acid, ester and amide groups, agitating the reaction mixture for a time sufficient to form polymerization and condensation products and to effect hydrogen exchange to form a polyunsaturated drying oil and a saturated hydrocarbon material, separating the reaction mixture into a hydrocarbon layer and an aluminum bromide layer, recovering a drying oil from the aluminum bromide layer and recovering a saturated hydrocarbon product from the hydrocarbon layer.

16. A process for producing a drying oil which comprises mixing from about 0.1 to about 10 parts by weight of boron trifluoride and 1 part by weight of a mixture of 1 molar proportion of a carbonylic compound and 1–50 molar proportions of a monoolefinic hydrocarbon having at least 3 carbon atoms per molecule from about 0° to about 175° C., said carbonylic compound being a saturated compound containing a radical of the class consisting of aldehyde, ketone, carboxylic acid, ester and amide groups, agitating the reaction mixture for a time sufficient to form polymerization and condensation products and to effect hydrogen exchange to form a polyunsaturated drying oil and a saturated hydrocarbon material, separating the reaction mixture into a hydrocarbon layer and a boron trifluoride layer, recovering a drying oil from the boron trifluoride layer and recovering a saturated hydrocarbon product from the hydrocarbon layer.

17. A process for producing a drying oil which comprises mixing from about 0.1 to about 10 parts by weight of boron trifluoride and 1 part by weight of a mixture of 1 molar proportion of a carbonylic compound and 1–50 molar proportions of a propylene at a temperature of from about 0° to about 175° C., said carbonylic compound being a saturated compound containing a radical of the class consisting of aldehyde, ketone, carboxylic acid, ester and amide groups, agitating the reaction mixture for a time sufficient to form polymerization and condensation products and to effect hydrogen exchange to form a polyunsaturated drying oil and a saturated hydrocarbon material, separating the reaction mixture into a hydrocarbon layer and a boron trifluoride layer, recovering a drying oil from the boron trifluoride layer and recovering a saturated hydrocarbon product from the hydrocarbon layer.

18. A process for producing a drying oil which comprises mixing from about 0.1 to about 10 parts by weight of boron trifluoride and 1 part by weight of a mixture of 1 molar proportion of a carbonylic compound and 1–50 molar proportions of butylene at a temperature of from about 0° to about 175° C., said carbonylic compound being a saturated compound containing a radical of the class consisting of aldehyde, ketone, carboxylic acid, ester and amide groups, agitating the reaction mixture for a time sufficient to form polymerization and condensation products and to effect hydrogen exchange to form a polyunsaturated drying oil and a saturated hydrocarbon material, separating the reaction mixture into a hydrocarbon layer and a boron trifluoride layer, recovering a drying oil from the boron trifluoride layer and recovering a saturated hydrocarbon product from the hydrocarbon layer.

19. A process for producing a drying oil which comprises mixing from about 0.1 to about 10 parts by weight of a boron trifluoride and 1 part by weight of a mixture of 1 molar proportion of a carbonylic compound and 1–50 molar proportions of a normally liquid monoolefin having at least 3 carbon atoms per molecule at a temperature of from about 0° to about 175° C., said carbonylic compound being a saturated compound containing a radical of the class consisting of aldehyde, ketone, carboxylic acid, ester and amide groups, agitating the reaction mixture for a time sufficient to form polymerization and condensation products and to effect hydrogen exchange to form a polyunsaturated drying oil and a saturated hydrocarbon material, separating the reaction mixture into a hydrocarbon layer and a boron trifluoride layer, recovering a drying oil from the boron trifluoride layer and recovering a saturated hydrocarbon product from the hydrocarbon layer.

20. A process for producing a drying oil which comprises mixing from about 0.1 to about 10 parts by weight of boron trifluoride and 1 part by weight of a mixture of 1 molar proportion of a carbonylic compound and 1–50 molar proportions of a polymer gasoline having at least 3 carbon atoms per molecule at a temperature of from about 0° to about 175° C., said carbonylic compound being a saturated compound containing a radical of the class consisting of aldehyde, ketone, carboxylic acid, ester and amide groups, agitating the reaction mixture for a time sufficient to form polymerization and condensation products and to effect hydrogen exchange to form a polyunsaturated drying oil and a saturated hydrocarbon material, separating the reaction mixture into a hydrocarbon layer and a boron trifluoride layer, recovering a drying oil from the boron trifluoride layer and recovering a saturated hydrocarbon product from the hydrocarbon layer.

References Cited in the file of this patent

UNITED STATES PATENTS

| | | |
|---|---|---|
| 2,252,333 | Rothrock | Aug. 12, 1941 |
| 2,253,323 | Christmann | Aug. 19, 1941 |
| 2,440,459 | Bloch | Apr. 27, 1948 |